US007920884B2

(12) United States Patent
Agrawal et al.

(10) Patent No.: US 7,920,884 B2
(45) Date of Patent: Apr. 5, 2011

(54) FRAME STRUCTURES FOR A WIRELESS COMMUNICATION SYSTEM WITH MULTIPLE RADIO TECHNOLOGIES

(75) Inventors: Avneesh Agrawal, San Diego, CA (US); Durga Prasad Malladi, San Diego, CA (US); Anastasios Stamoulis, San Diego, CA (US); Ashok Mantravadi, San Diego, CA (US); Ramaswamy Murali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1061 days.

(21) Appl. No.: 11/144,208

(22) Filed: Jun. 2, 2005

(65) Prior Publication Data

US 2006/0018279 A1  Jan. 26, 2006

Related U.S. Application Data

(60) Provisional application No. 60/577,083, filed on Jun. 4, 2004.

(51) Int. Cl.
*H04Q 7/20* (2006.01)
*H04Q 7/00* (2006.01)
(52) U.S. Cl. ........ 455/516; 455/517; 455/464; 455/509; 370/330; 370/335
(58) Field of Classification Search .................. 455/3.02, 455/414.1, 414.4, 454, 464, 502, 503, 516, 455/517, 455, 515, 17, 23, 42, 205, 509; 370/342, 208, 314, 347, 335
See application file for complete search history.

(56) References Cited

U.S. PATENT DOCUMENTS

| 4,914,651 | A | 4/1990 | Lusignan |
| 5,602,868 | A | 2/1997 | Wilson |
| 5,699,363 | A | 12/1997 | Wishart et al. |
| 5,867,478 | A | 2/1999 | Baum et al. |

(Continued)

FOREIGN PATENT DOCUMENTS

CA         2314404          1/2002

(Continued)

OTHER PUBLICATIONS

International Search Report—PCT/US05/019544, International Search Authority-European Patent Office, Dec. 12, 2005.
International Preliminary Report on Patentability—PCT/US05/019544, International Search Authority-The International Bureau of WIPO—Geneva, Switzerland-Dec. 4, 2006.
Written Opinion—PCT/US05/019544, International Search Authority-European Patent Office-Dec. 12, 2005.

(Continued)

*Primary Examiner* — John Lee
(74) *Attorney, Agent, or Firm* — Larry J. Moskowitz

(57) ABSTRACT

Frame structures and transmission techniques for a wireless communication system are described. In one frame structure, a super-frame includes multiple outer-frames, and each outer-frame includes multiple frames, and each frame includes multiple time slots. The time slots in each super-frame are allocated for downlink and uplink and for different radio technologies (e.g., W-CDMA and OFDM) based on loading. Each physical channel is allocated at least one time slot in at least one frame of each outer-frame in the super-frame. An OFDM waveform is generated for each downlink OFDM slot and multiplexed onto the slot. A W-CDMA waveform is generated for each downlink W-CDMA slot and multiplexed onto the slot. A modulated signal is generated for the multiplexed W-CDMA and OFDM waveforms and transmitted on the downlink. Each physical channel is transmitted in bursts. The slot allocation and coding and modulation for each physical channel can change for each super-frame.

23 Claims, 12 Drawing Sheets

U.S. PATENT DOCUMENTS

| | | | |
|---|---|---|---|
| 5,943,344 | A | 8/1999 | Keller et al. |
| 6,115,354 | A | 9/2000 | Weck |
| 6,366,309 | B1 | 4/2002 | Siegle |
| 6,470,024 | B1 | 10/2002 | Hamalainen et al. |
| 6,567,375 | B2 | 5/2003 | Balachandran et al. |
| 6,594,473 | B1 | 7/2003 | Dabak et al. |
| 6,661,771 | B1 | 12/2003 | Cupo et al. |
| 6,747,948 | B1 | 6/2004 | Sarraf et al. |
| 6,788,661 | B1 | 9/2004 | Ylitalo et al. |
| 6,795,419 | B2 | 9/2004 | Parantainen et al. |
| 6,842,487 | B1 | 1/2005 | Larsson |
| 6,853,629 | B2 | 2/2005 | Alamouti et al. |
| 6,885,630 | B2 | 4/2005 | Kostic et al. |
| 6,909,702 | B2 | 6/2005 | Leung et al. |
| 6,927,728 | B2 | 8/2005 | Vook et al. |
| 6,940,824 | B2 | 9/2005 | Shibutani |
| 6,940,827 | B2 | 9/2005 | Li et al. |
| 6,961,388 | B2 | 11/2005 | Ling et al. |
| 6,999,467 | B2 | 2/2006 | Krauss et al. |
| 7,027,523 | B2 | 4/2006 | Jalali et al. |
| 7,099,270 | B2 | 8/2006 | Yamaguchi |
| 7,110,387 | B1 | 9/2006 | Kim et al. |
| 7,139,237 | B2 | 11/2006 | Nangia et al. |
| 7,181,170 | B2 | 2/2007 | Love et al. |
| 7,273,869 | B2 | 9/2007 | Lindsley et al. |
| 7,280,552 | B2 | 10/2007 | Isson |
| 7,292,651 | B2 | 11/2007 | Li |
| 7,313,118 | B2 | 12/2007 | Geers |
| 7,379,416 | B2 | 5/2008 | Yang et al. |
| 7,391,715 | B2 | 6/2008 | Lee et al. |
| 7,433,418 | B1 | 10/2008 | Dogan et al. |
| 7,436,903 | B2 | 10/2008 | Sandhu et al. |
| 7,471,729 | B2 | 12/2008 | Miyoshi |
| 7,483,366 | B2 | 1/2009 | Joo et al. |
| 7,706,346 | B2 | 4/2010 | Huo et al. |
| 2002/0086691 | A1 | 7/2002 | Kostic et al. |
| 2002/0141447 | A1 | 10/2002 | Leung et al. |
| 2002/0159422 | A1* | 10/2002 | Li et al. ............ 370/342 |
| 2003/0002450 | A1 | 1/2003 | Jalali et al. |
| 2003/0002518 | A1 | 1/2003 | Shibutani |
| 2003/0043928 | A1 | 3/2003 | Ling et al. |
| 2003/0072255 | A1* | 4/2003 | Ma et al. .............. 370/208 |
| 2003/0074476 | A1 | 4/2003 | Kim et al. |
| 2003/0081538 | A1 | 5/2003 | Walton et al. |
| 2003/0137926 | A1 | 7/2003 | Joo et al. |
| 2003/0152043 | A1* | 8/2003 | Geers ................... 370/314 |
| 2003/0156570 | A1* | 8/2003 | Alamouti et al. ....... 370/347 |
| 2003/0174642 | A1 | 9/2003 | Yang et al. |
| 2003/0174645 | A1 | 9/2003 | Paratainen et al. |
| 2003/0227866 | A1 | 12/2003 | Yamaguchi |
| 2004/0086055 | A1 | 5/2004 | Li |
| 2004/0178954 | A1 | 9/2004 | Vook et al. |
| 2004/0213145 | A1 | 10/2004 | Nakamura |
| 2004/0228294 | A1 | 11/2004 | Kim et al. |
| 2005/0014464 | A1 | 1/2005 | Larsson |
| 2005/0047481 | A1 | 3/2005 | Lyle et al. |
| 2005/0063345 | A1* | 3/2005 | Wu et al. .............. 370/335 |
| 2005/0163258 | A1 | 7/2005 | Gore et al. |
| 2005/0249177 | A1 | 11/2005 | Huo et al. |
| 2005/0276344 | A1 | 12/2005 | Ling et al. |
| 2007/0070944 | A1 | 3/2007 | Rinne et al. |
| 2007/0189404 | A1 | 8/2007 | Baum et al. |

FOREIGN PATENT DOCUMENTS

| | | |
|---|---|---|
| CA | 2354196 A1 | 1/2003 |
| DE | 04425713 | 7/1995 |
| EP | 0588741 | 3/1994 |
| EP | 1061687 | 12/2000 |
| EP | 1065855 | 1/2001 |
| EP | 1109365 | 6/2001 |
| EP | 1148673 | 10/2001 |
| EP | 1387545 | 2/2004 |
| GB | 2394871 | 5/2004 |
| JP | 20000236343 | 8/2000 |
| JP | 2001-511966 | 8/2001 |
| JP | 2001-320346 | 11/2001 |
| JP | 2001-358694 | 12/2001 |
| JP | 2003-018647 | 1/2003 |
| JP | 200432380 | 1/2004 |
| JP | 2004064654 A | 2/2004 |
| JP | 2004-096445 | 3/2004 |
| JP | 2004096186 | 3/2004 |
| JP | 2004158901 A | 6/2004 |
| JP | 2004159303 | 6/2004 |
| JP | 2004533746 | 11/2004 |
| JP | 2007-518290 | 7/2007 |
| JP | 2008-502224 | 1/2008 |
| JP | 2008-502225 | 1/2008 |
| KR | 1020040011653 | 2/2004 |
| WO | 9730531 | 8/1997 |
| WO | 98024250 | 6/1998 |
| WO | 99059278 | 11/1999 |
| WO | 00004728 | 1/2000 |
| WO | 01001626 | 1/2001 |
| WO | 0161899 | 8/2001 |
| WO | 0204086 | 1/2002 |
| WO | 0205004 | 1/2002 |
| WO | 0211317 | 2/2002 |
| WO | 0221715 | 3/2002 |
| WO | 0235735 | 5/2002 |
| WO | WO02062002 A1 | 8/2002 |
| WO | 02073831 | 9/2002 |
| WO | 02082834 | 10/2002 |
| WO | 03034642 | 4/2003 |
| WO | WO03034645 A1 | 4/2003 |
| WO | WO2004036767 | 4/2004 |
| WO | WO2004068780 A1 | 8/2004 |
| WO | 2004086711 | 10/2004 |
| WO | 2005004428 | 1/2005 |
| WO | 2005022811 | 3/2005 |
| WO | 2005071867 | 8/2005 |

OTHER PUBLICATIONS

"3rd Generation Partnership Project 2 '3GPP2' CDMA2000 High Rate Packet Data Air Interface Specification," 3GPP2 C.S0024 Version 3.0, Dec. 5, 2001.

3GPP2, CDMA2000 High Rate Packed Data Air Interface Specification, Sep. 12, 2000, sections 7-1 to 7-30.

Alasti et al., "A Discrete Multi Carrier Multiple Access Technique for Wireless Communications." Vehicular Technology Conference, vol. 2, May 18, 1998, pp. 1533-1537, New York, US.

Dammann et al., "Transmit/Receive-Antenna Diversity Techniques for OFDM Systems." European Transactions on Telecommunications. vol. 13, No, 5, Sep. 2002. pp. 531-538, Milano, IT.

Shaoping Chen et al., "A Space-Time Coding Scheme with Maximum Diversity Gains Over Frequency-Selective Fading Channels." Personal, Indoor and Mobile Radio Communications, vol. 2, Sep. 7, 2003—Sep. 10, 2003, pp. 2567-2570, Piscataway, NJ.

Weck C., "Coverage Aspects of Digital Terrestrial Television Broadcasting" EBU Review-Technical, European Broadcasting Union, No. 270, Dec. 21, 1996, pp. 19-30.

Van Duc Nguyen et al., "Performance of Channel Estimation Using Pilot Symbols for a Coherent OFDM System" International Symposium on Wireless Personal Multimedia Communications, vol. 2, Nov. 12, 2000, pp. 842-847.

"Introduction of Multimedia Broadcast/Multicast Service (MBMS) in the Radio Access Network (RAN)". ETSI-3GPP, version 6.1, Jul. 2004, pp. 1-52.

International Search Report and Written Opinion - PCT/US05/019529, International Search Authority-European Patent Office, Oct. 11, 2005.

International Search Report and Written Opinion - PCT/US05/019541, International Search Authority-European Patent Office, Sep. 28, 2005.

International Search Report and Written Opinion - PCT/US05/019542 International Search Authority-US, Oct. 5, 2005.

International Search Report and Written Opinion - PCT/US05/019543, International Search Authority-European Patent Office, Sep. 27, 2005.

3GPP TSG RAN WG2 #41, R2-040416, LG Electronics Inc.:"MCCH Scheduling," pp. 1-3, Malaga, Spain Feb. 16-20 2004.

* cited by examiner

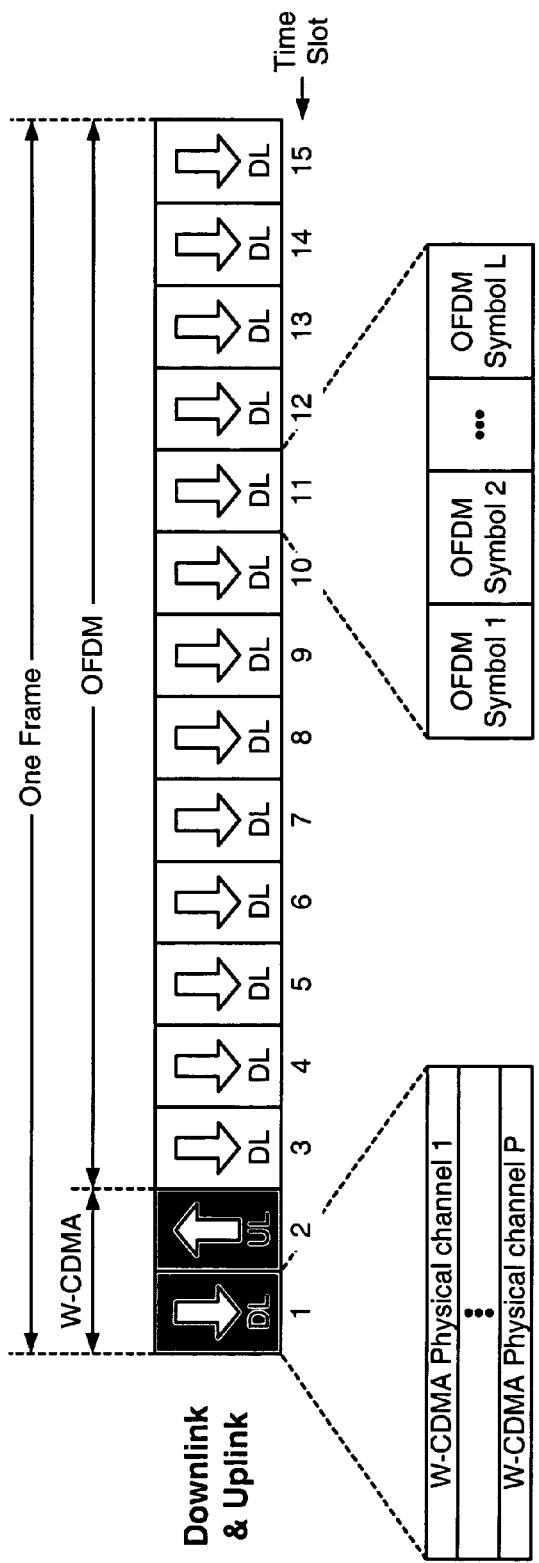
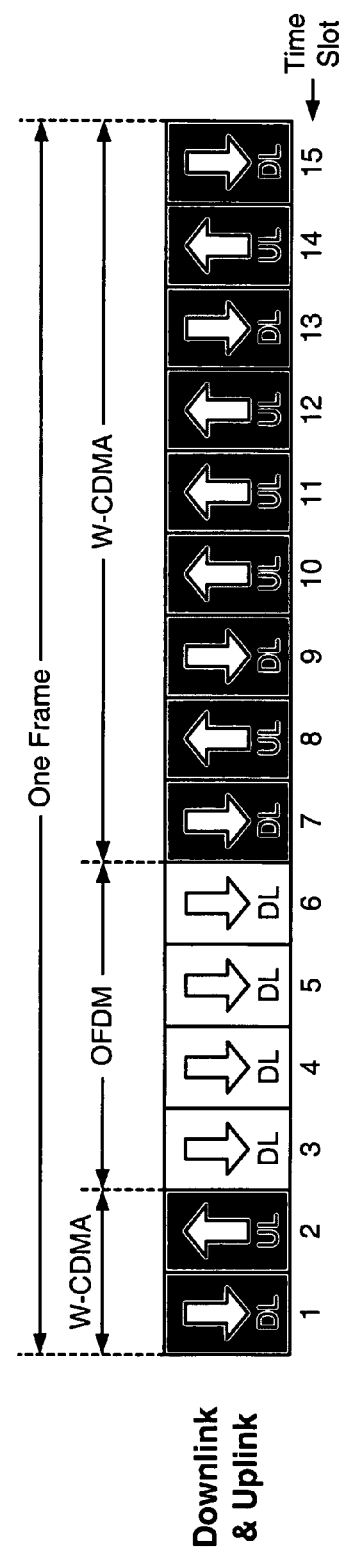
FIG. 4A
FIG. 4B

FRAME STRUCTURES FOR A WIRELESS COMMUNICATION SYSTEM WITH MULTIPLE RADIO TECHNOLOGIES

CLAIM OF PRIORITY UNDER 35 U.S.C. §119

The present Application for Patent claims priority to Provisional Application Ser. No. 60/577,083, entitled "FLO-TDD physical layer," filed Jun. 4, 2004, assigned to the assignee hereof, and expressly incorporated herein by reference.

BACKGROUND

I. Field

The present invention relates generally to communication, and more specifically to data transmission in a wireless communication system.

II. Background

Wireless communication systems are widely deployed to provide various communication services such as voice, packet data, multi-media broadcast, text messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement a radio access technology (RAT) such as Wideband CDMA (W-CDMA), cdma2000, and so on. RAT refers to the technology used for over-the-air communication. W-CDMA is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

W-CDMA and cdma2000 employ direct sequence CDMA (DS-CDMA) radio technology. DS-CDMA spectrally spreads a narrowband signal over the entire system bandwidth with a spreading code, which is called a scrambling code in W-CDMA and a pseudo-random noise (PN) code in cdma2000. DS-CDMA has certain advantages such as ease of supporting multiple access, narrowband rejection, and so on. However, DS-CDMA is susceptible to frequency selective fading, which is a frequency response that is not flat across the system bandwidth. Frequency selective fading results from time dispersion in a wireless channel and causes intersymbol interference (ISI), which can degrade performance. A complicated receiver with an equalizer may be needed to combat the intersymbol interference.

There is therefore a need in the art for a wireless communication system capable of supporting multiple users and providing improved performance.

SUMMARY

Frame structures and transmission techniques that can provide good performance for different types of transmission in a wireless communication system are described herein. The frame structures and transmission techniques may be used for various radio technologies such as W-CDMA, Orthogonal Frequency Division Multiplexing (OFDM), and so on. The frame structures and transmission techniques may also be used for various types of transmissions (e.g., user-specific, multi-cast, and broadcast transmissions) and for various services (e.g., Enhanced Multimedia Broadcast/Multicast Service (E-MBMS)).

According to an embodiment of the invention, an apparatus is described which includes first and second modulators and a multiplexer. The first modulator generates a first waveform in accordance with a first radio technology (e.g., W-CDMA). The second modulator generates a second waveform in accordance with a second radio technology (e.g., OFDM). The multiplexer multiplexes the first waveform onto a first time slot and multiplexes the second waveform onto a second time slot.

According to another embodiment, an apparatus is described which includes first and second modulators and a multiplexer. The first modulator generates a W-CDMA waveform, and the second modulator generates an OFDM waveform. The multiplexer multiplexes the W-CDMA waveform onto a first time slot and multiplexes the OFDM waveform onto a second time slot.

According to yet another embodiment, a method is provided in which a W-CDMA waveform is generated and multiplexed onto a first time slot, and an OFDM waveform is generated and multiplexed onto a second time slot.

According to yet another embodiment, an apparatus is described which includes means for generating a W-CDMA waveform, means for generating an OFDM waveform, means for multiplexing the W-CDMA waveform onto a first time slot, and means for multiplexing the OFDM waveform onto a second time slot.

According to yet another embodiment, an apparatus is described which includes a controller and a processor. The controller selects at least one radio technology among multiple radio technologies (e.g., W-CDMA and OFDM) for each time slot in each outer-frame of a super-frame. The super-frame comprises multiple outer-frames and each outer-frame comprises multiple time slots. The processor processes data for each time slot in accordance with the at least one radio technology selected for that time slot.

According to yet another embodiment, a method is provided in which at least one radio technology is selected from among multiple radio technologies for each time slot in each outer-frame of a super-frame. Data for each time slot is processed in accordance with the at least one radio technology selected for that time slot.

According to yet another embodiment, an apparatus is described which includes means for selecting at least one radio technology among multiple radio technologies for each time slot in each outer-frame of a super-frame and means for processing data for each time slot in accordance with the at least one radio technology selected for that time slot.

According to yet another embodiment, an apparatus is described which includes a controller and a multiplexer. The controller allocates at least one time slot in each outer-frame of a super-frame to a physical channel. The multiplexer multiplexes data for the physical channel onto the at least one time slot allocated to the physical channel in each outer-frame of the super-frame. The physical channel may be sent using OFDM, and other data may be sent using W-CDMA or some other radio technology.

According to yet another embodiment, a method is provided in which a physical channel is allocated at least one time slot in each outer-frame of a super-frame. Data for the physical channel is multiplexed onto the at least one time slot allocated to the physical channel in each outer-frame of the super-frame.

According to yet another embodiment, an apparatus is described which includes means for allocating a physical channel with at least one time slot in each outer-frame of a super-frame and means for multiplexing data for the physical channel onto the at least one time slot allocated to the physical channel in each outer-frame of the super-frame.

According to yet another embodiment, an apparatus is described which includes a demultiplexer and first and second demodulators. The demultiplexer receives samples, provides to the first demodulator samples for a W-CDMA waveform sent in a first time slot, and provides to the second demodulator samples for an OFDM waveform sent in a second time slot. The first demodulator processes the samples for the W-CDMA waveform, and the second demodulator processes the samples for the OFDM waveform.

According to yet another embodiment, a method is provided in which a W-CDMA waveform is received in a first time slot, an OFDM waveform is received in a second time slot, the received W-CDMA waveform is processed to obtain data sent using W-CDMA, and the received OFDM waveform is processed to obtain data sent using OFDM.

According to yet another embodiment, an apparatus is described which includes a controller and a demultiplexer. The controller determines at least one time slot allocated to a physical channel in each outer-frame of a super-frame. The demultiplexer provides samples received in the at least one time slot allocated to the physical channel in each outer-frame of the super-frame. The physical channel is sent using OFDM, and other data may be sent using W-CDMA or some other radio technology.

According to yet another embodiment, a method is provided in which at least one time slot allocated to a physical channel in each outer-frame of a super-frame is determined. Samples received in the at least one time slot allocated to the physical channel in each outer-frame of the super-frame are demultiplexed and processed.

Various aspects and embodiments of the invention are described in further detail below.

BRIEF DESCRIPTION OF THE DRAWINGS

FIGS. 4A and 4B show multiplexing of W-CDMA and OFDM in a TDD system.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
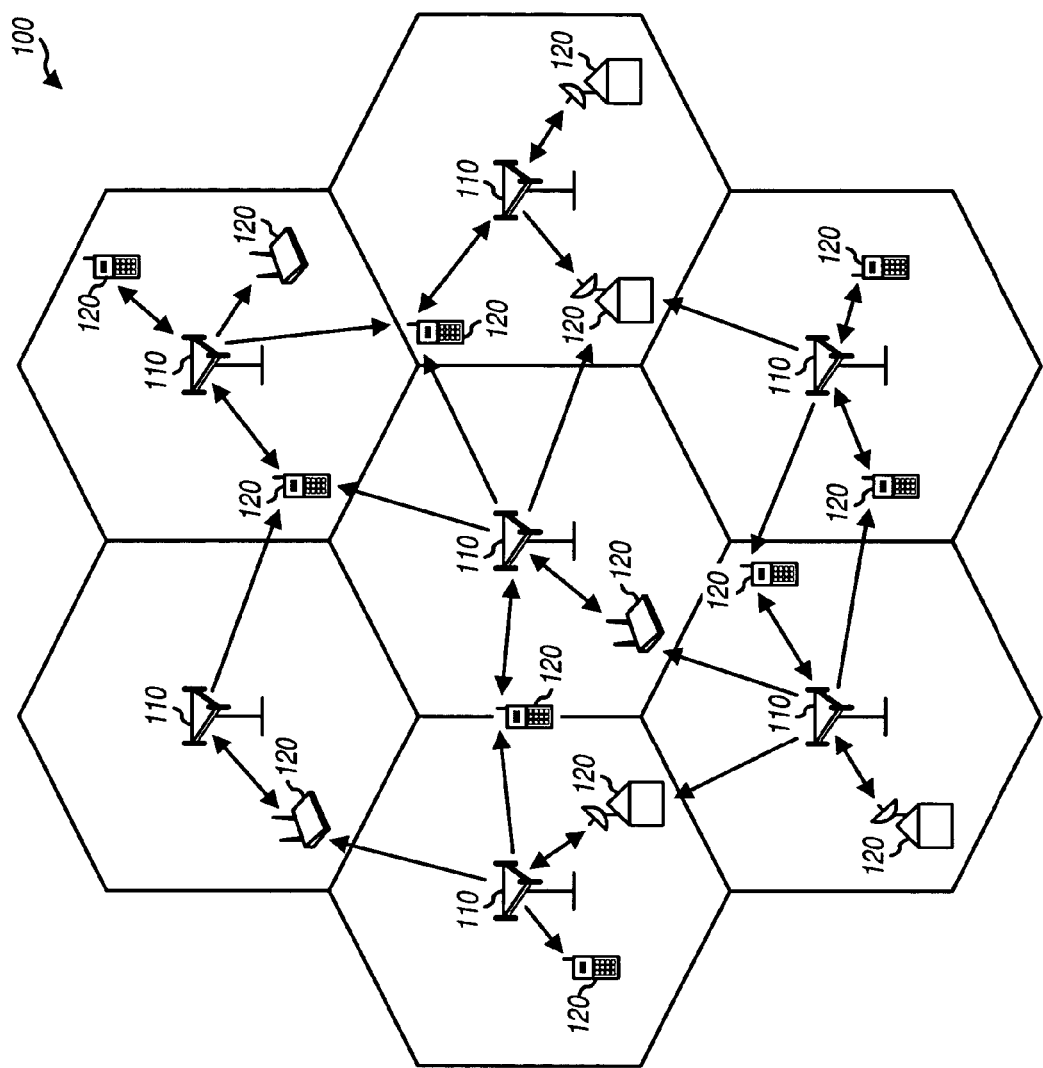
FIG. 1 shows a wireless communication system.

FIG. 1 shows a wireless communication system 100 with multiple base stations 110 and multiple terminals 120. A base station is generally a fixed station that communicates with the terminals and may also be called an access point, a Node B, a base transceiver subsystem (BTS), or some other terminology. Each base station 110 provides communication coverage for a particular geographic area. The term "cell" can refer to a base station and/or its coverage area depending on the context in which the term is used. To improve system capacity, the base station coverage area may be partitioned into multiple smaller areas. Each smaller area is served by a respective BTS. The term "sector" can refer to a BTS and/or its coverage area depending on the context in which the term is used. For simplicity, in the following description, the term "base station" is used generically for both a fixed station that serves a cell and a fixed station that serves a sector.

Terminals 120 may be dispersed throughout the system. A terminal may be fixed or mobile and may also be called a mobile station, a wireless device, a user equipment, a user terminal, a subscriber unit, or some other terminology. The terms "terminal" and "user" are used interchangeably herein. A terminal may communicate with zero, one, or multiple base stations at any given moment. A terminal may also communicate with a base station on the downlink and/or uplink. The downlink (or forward link) refers to the communication link from the base station to the terminal, and the uplink (or reverse link) refers to the communication link from the terminal to the base station.

The frame structures and transmission techniques described herein may be used with various radio technologies such as W-CDMA, cdma2000, IS-856, other versions of CDMA, OFDM, Interleaved FDMA (IFDMA) (which is also called Distributed FDMA), Localized FDMA (LFDMA) (which is also called Narrowband FDMA or Classical FDMA), Global System for Mobile Communications (GSM), direct sequence spread spectrum (DSSS), frequency hopping spread spectrum (FHSS), and so on. OFDM, IFDMA, and LFDMA are multi-carrier radio technologies that effectively partition the overall system bandwidth into multiple (S) orthogonal frequency subbands. These subbands are also called tones, subcarriers, bins, and frequency channels. Each subband is associated with a respective subcarrier that may be modulated with data. OFDM transmits modulation symbols in the frequency domain on all or a subset of the S subbands. IFDMA transmits modulation symbols in the time domain on subbands that are uniformly spaced across the S subbands. LFDMA transmits modulation symbols in the time domain and typically on adjacent subbands. The use of OFDM for unicast, multicast, and broadcast transmissions may also be considered as different radio technologies. The list of radio technologies given above is not exhaustive, and the frame structures and transmission techniques may also be used for other radio technologies not mentioned above. For clarity, the frame structures and transmission techniques are specifically described below for W-CDMA and OFDM.

Figure 2:
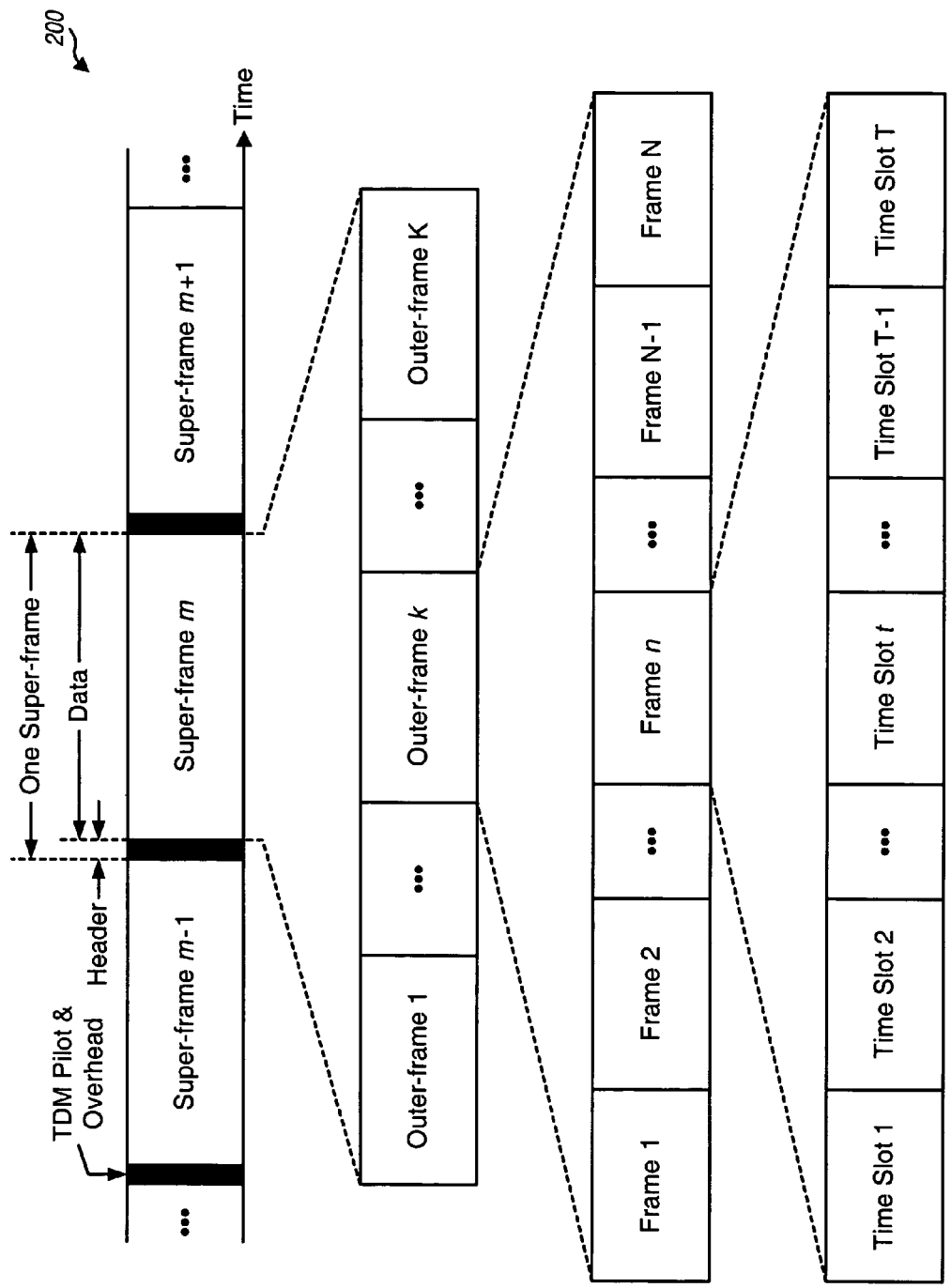
FIG. 2 shows an exemplary 4-tier frame structure.

FIG. 2 shows an exemplary 4-tier frame structure 200 that supports multiple radio technologies such as W-CDMA and OFDM. The transmission time line is partitioned into super-frames, with each super-frame having a predetermined time duration, e.g., approximately one second. For the embodiment shown in FIG. 2, each super-frame includes (1) a header field for a time division multiplexed (TDM) pilot and overhead/control information and (2) a data field for traffic data and a frequency division multiplexed (FDM) pilot. The TDM pilot in the header field may be used for synchronization, e.g., super-frame detection, frequency error estimation, and timing acquisition). The TDM and FDM pilots may be used for channel estimation. The overhead information for each super-frame may convey various parameters for the physical channels sent in that super-frame. The data field of each super-frame is partitioned into K equal-size outer-frames to facilitate data transmission, where K>1. Each outer-frame is partitioned into N frames, and each frame is further partitioned into T time slots, where N>1 and T>1. The super-frame, outer-frame, frame, and time slot may also be referred to by some other terminology.

In general, a super-frame may include any number of outer-frames, frames, and time slots. In a specific embodiment, each super-frame includes four outer-frames (K=4), each outer-frame includes 32 frames (N=32), and each frame includes 15 time slots (T=15). The frames and time slots may be defined to conform to W-CDMA. In this case, each frame has a duration of 10 milliseconds (ms), each time slot has a duration of 0.667 ms and spans 2560 chips, and each chip has a duration of 0.26 microseconds ($\mu$s) for a system bandwidth of 3.84 MHz. For this embodiment, each outer-frame has a duration of 320 ms, and each super-frame has a duration of approximately 1.28 seconds. Other values may also be used for K, N, and T, as described below. The mapping of physical channels to time slots in frame structure 200 is also described below.

Figure 3:
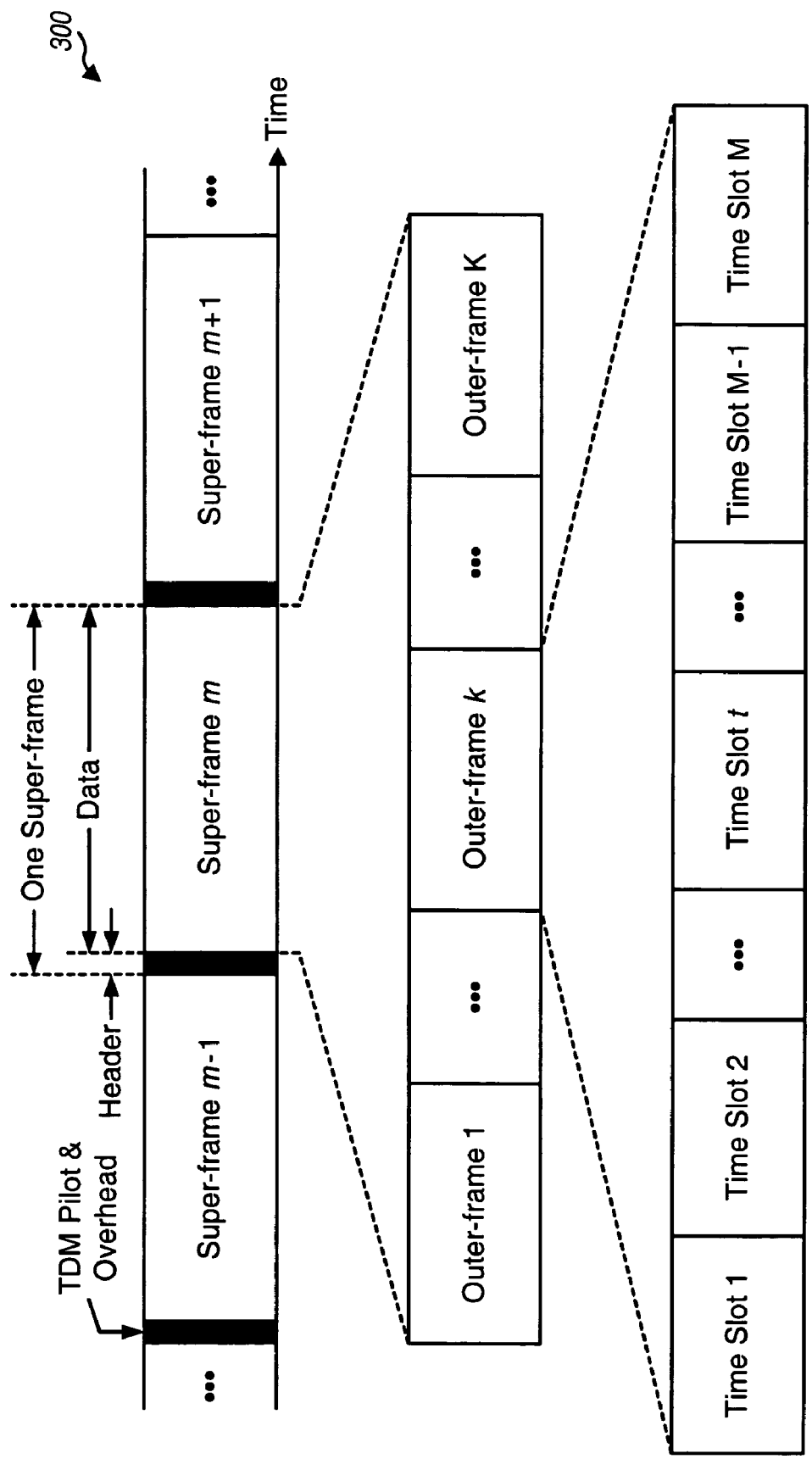
FIG. 3 shows an exemplary 3-tier frame structure.

FIG. 3 shows an exemplary 3-tier frame structure 300 that also supports multiple radio technologies. The transmission time line is partitioned into super-frames, with each super-frame having a header field for pilot and overhead and a data field for traffic data and possibly pilot. The data field of each super-frame is partitioned into K outer-frames, and each outer-frame is partitioned into M time slots (e.g., M=N·T), where K>1 and M>1. In a specific embodiment, each super-frame includes four outer-frames (K=4), and each outer-frame includes 480 time slots (M=480). Each time slot may be defined to conform to W-CDMA and have a duration of 0.667 ms. Other values may also be used for K and M.

Other 3-tier frame structures may also be defined. For example, a 3-tier frame structure may be defined with each super-frame including K outer-frames, and each outer-frame including N frames, where K>1 and N>1. In a specific embodiment, each super-frame includes four outer-frames (K=4), and each outer-frame includes 32 frames (N=32). Each frame may be defined to conform to W-CDMA and have a duration of 10 ms. Other values may also be used for K and N. As another example, a 3-tier frame structure may be defined with each super-frame including $N_K$ frames (e.g., $N_K$=K·N), and each frame including T time slots.

Two-tier frame structures that support multiple radio technologies may also be defined. For example, a 2-tier frame structure may be defined with each super-frame including $N_K$ frames. As another example, a 2-tier frame structure may be defined with each super-frame including $T_{KN}$ time slots (e.g., $T_{KN}$=K·N·T).

In general, a frame structure with any number of tiers may be used to support multiple radio technologies. More tiers can provide more flexibility in (1) mapping of physical channels to the available system resources, which may be in units of frame, time slot, subband, and so on, (2) encoding of data for the physical channels, and (3) transmission of data in a manner to improve time diversity and reduce battery power consumption for reception. For clarity, much of the following description is for the 4-tier frame structure shown in FIG. 2.

A frame structure with super-frames and outer-frames can provide various advantages. In an embodiment, a super-frame is the duration over which (1) system resources are allocated to physical channels and (2) overhead information is sent to convey the system resources allocated to the physical channels. The resource allocation may change from super-frame to super-frame. The overhead information conveying the resource allocation is sent at the start of each super-frame, as shown in FIGS. 2 and 3, which allows the terminals to use the overhead information to recover the physical channels sent in that super-frame. The super-frame size may be selected to reduce latency whenever a user switches between physical channels.

In an embodiment, a super-frame is also the duration over which (1) the rate for each physical channel is fixed and (2) block encoding, if any, is performed for each physical channel. The system may support a set of rates, and each support rate may be associated with a specific coding scheme and/or code rate, a specific modulation scheme, a specific packet size, a specific block size, and so on. The rate for a physical channel may change from super-frame to super-frame and may be conveyed in the overhead information sent at the start of each super-frame.

In general, a super-frame may be of any time duration. The super-frame size may be selected based on various factors such as, for example, the desired amount of time diversity, acquisition time for data streams sent on physical channels, the desired statistical multiplexing for the data streams, buffer requirements for the terminals, and so on. A larger super-frame size provides more time diversity and better statistical multiplexing, so that less buffering may be required for individual data streams at a base station. However, a larger super-frame size also results in (1) longer acquisition time for a new data stream (e.g., at power-on or when switching between data streams), (2) longer decoding delay, and (3) larger buffer requirements for the terminals. A super-frame size of approximately one second may provide a good tradeoff between the various factors noted above. However, other super-frame sizes (e.g., a quarter, a half, two, or four seconds) may also be used.

In an embodiment, traffic data to be sent on a physical channel in a super-frame is partitioned into K subblocks. The K subblocks are transmitted in bursts on the K outer-frames of the super-frame, one subblock in each outer-frame. Transmission of the traffic data over K outer-frames provides time diversity. Transmission of each subblock in a burst reduces the amount of time needed to receive the subblock, which can conserve battery power and extend standby time for a terminal. The transmission of traffic data in subblocks in combination with block coding can also provide certain advantages. For example, a data block may be encoded with a block code to generate K subblocks. If all subblocks containing traffic data are transmitted in earlier outer-frames and are received correctly, then the subblock(s) containing parity data may be skipped, which can save battery power.

The frame structures and transmission techniques described herein may be used for both time division duplex (TDD) and frequency division duplex (FDD) systems. In a TDD system, the downlink and uplink share the same frequency band, with the downlink being allocated all or a portion of the time and the uplink being allocated the remaining portion of the time. Downlink and uplink transmissions are sent at different times in the TDD system. In an FDD system, the downlink and uplink are allocated separate frequency bands. Downlink and uplink transmissions may be sent simultaneously on separate frequency bands in the FDD system.

For a TDD system, each time slot in each frame may be used for either the downlink or uplink. A time slot used for the downlink is called a downlink slot, and a time slot used for the uplink is called an uplink slot. In general, a frame may include any number of downlink slots and any number of uplink slots. In an embodiment, each frame includes at least one downlink slot and at least one uplink slot. In another embodiment, each time slot in each frame may be used for the downlink or uplink without any restriction.

In general, any radio technology (e.g., W-CDMA or OFDM) may be used for each time slot. A time slot that uses W-CDMA is called a W-CDMA slot, and a time slot that uses OFDM is called an OFDM slot. Time slots that use OFDM for unicast, multicast, and broadcast transmissions may also be considered as different radio technologies. A time slot that is allocated for the downlink and uses OFDM is called an E-MBMS slot, a forward link only (FLO) slot, or some other terminology. In an embodiment, each frame includes at least one downlink W-CDMA slot and at least one uplink W-CDMA slot, and each remaining time slot may be used for downlink or uplink and for W-CDMA or OFDM. In another embodiment, each frame includes at least one uplink W-CDMA slot, and each remaining time slot may be used for downlink or uplink and for W-CDMA or OFDM. In yet another embodiment, each time slot in each frame may be used for downlink or uplink and for W-CDMA or OFDM, without any restriction.

FIG. 4A shows an exemplary multiplexing of W-CDMA and OFDM in a frame for a TDD system. In an embodiment, the first two time slots are reserved for a downlink W-CDMA slot and an uplink W-CDMA slot. Each of the remaining 13 time slots may be used for downlink or uplink and for W-CDMA or OFDM. For the example shown in FIG. 4A, all 13 remaining time slots are E-MBMS slots, which is the maximum number of E-MBMS slots in a frame for this embodiment.

For each W-CDMA slot, data for one or more physical channels may be channelized with different orthogonal (e.g., OVSF) sequences, spectrally spread with scrambling codes, combined in the time domain, and transmitted across the entire time slot. Each scrambling code is a sequence of 2560 PN chips, which corresponds to the length of a time slot. For each OFDM slot, data for one or more physical channels may be multiplexed and converted to L OFDM symbols, which are transmitted in the time slot, where $L \geq 1$. An exemplary mapping of physical channels to E-MBMS slots is described below.

FIG. 4B shows another exemplary multiplexing of W-CDMA and OFDM in a frame for a TDD system. In this example, the first two time slots are downlink and uplink W-CDMA slots, the next four time slots are E-MBMS slots, and the remaining nine time slots are downlink and uplink W-CDMA slots.

In general, each frame may include any number of E-MBMS slots, and the E-MBMS slots may be located anywhere in the frame. The E-MBMS slots may be adjacent to one another in a frame, as shown in FIGS. 4A and 4B. The E-MBMS slots may also be distributed across a frame and mixed with the W-CDMA slots.

For an FDD system, the downlink and uplink are allocated separate frequency bands. For each link, each time slot in each frame may use any radio technology (e.g., W-CDMA or OFDM).

Figure 5:
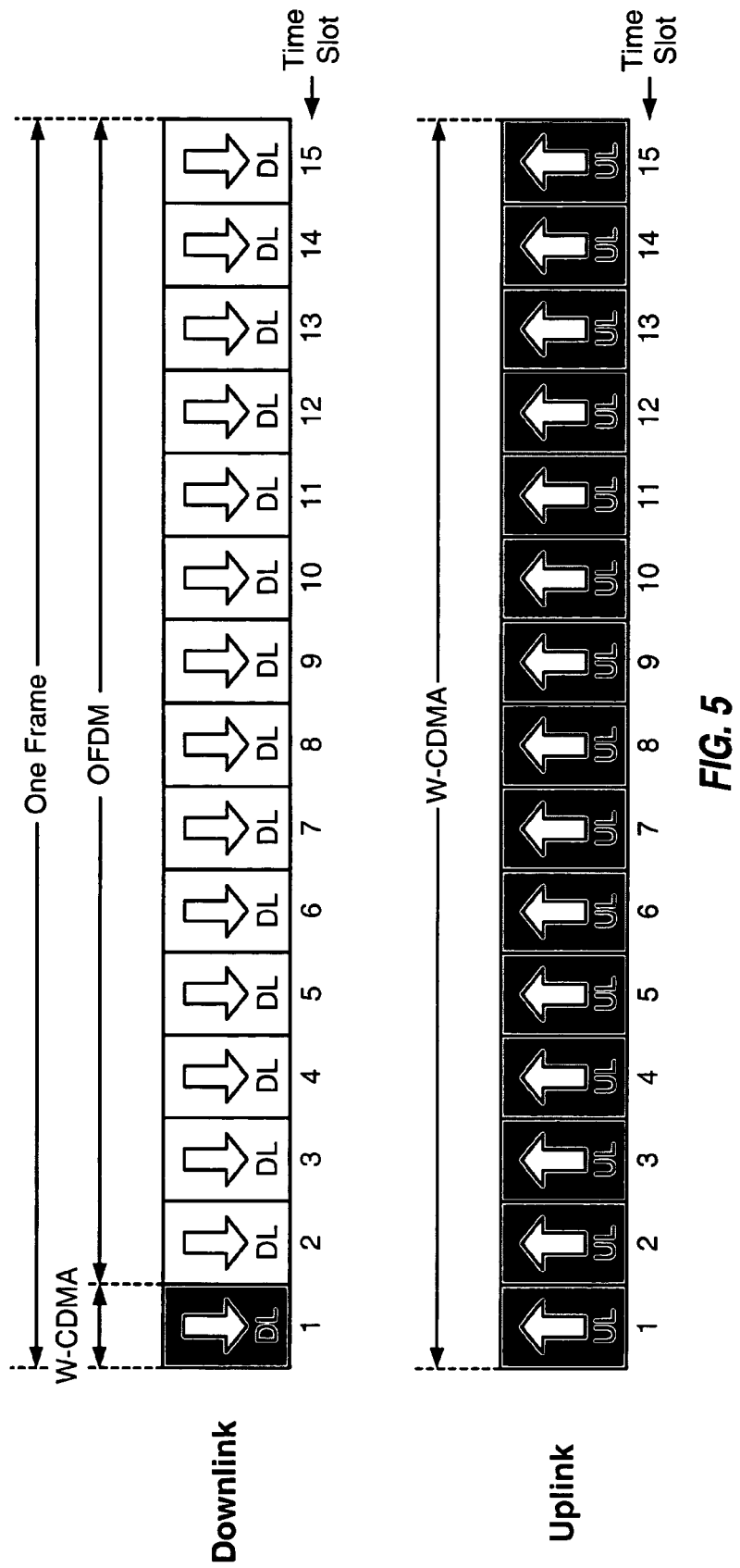
FIG. 5 shows multiplexing of W-CDMA and OFDM in an FDD system.

FIG. 5 shows an exemplary multiplexing of W-CDMA and OFDM in a frame for an FDD system. In this example, the first time slot in the downlink frame is a W-CDMA slot, the remaining 14 time slots in the downlink frame are OFDM slots, and all 15 slots in the uplink frame are W-CDMA slots. For each W-CDMA slot, one or more physical channels may be channelized, spectrally spread, combined, and transmitted in the time slot, as shown in FIG. 4A. For each OFDM slot, one or more physical channels may be multiplexed and sent in L OFDM symbols.

FIGS. 4A, 4B, and 5 show time division multiplexing (TDM) of W-CDMA and OFDM such that each time slot is used for either W-CDMA or OFDM. W-CDMA and OFDM may also be multiplexed using code division multiplexing (CDM), frequency division multiplexing (FDM), some other multiplexing scheme, or any combination of multiplexing schemes. W-CDMA and OFDM may also be combined using superposition.

Figure 6:
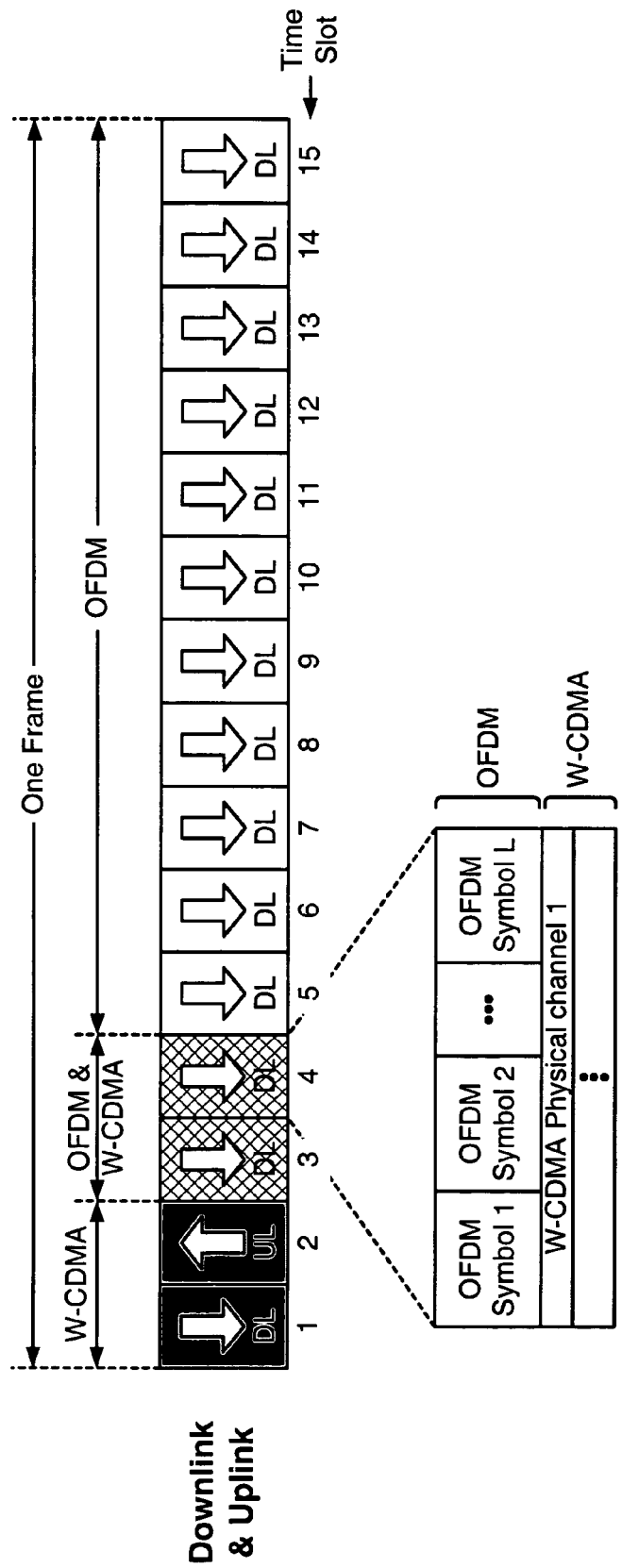
FIG. 6 shows transmission of W-CDMA and OFDM using superposition.

FIG. 6 shows an exemplary transmission of W-CDMA and OFDM using superposition. Each time slot in a frame may use W-CDMA or OFDM, or both. For the example shown in FIG. 6, the first two time slots use W-CDMA, the next two time slots use both W-CDMA and OFDM, and the remaining 11 time slots use OFDM. For each time slot with both W-CDMA and OFDM, which is called a mixed slot, data for one or more W-CDMA physical channels may be channelized with different orthogonal sequences and spectrally spread to generate a W-CDMA waveform. The W-CDMA waveform may be added to an OFDM waveform formed by L OFDM symbols to generate a composite waveform that is transmitted in the mixed slot.

The superposition of a W-CDMA waveform with an OFDM waveform in a mixed slot results in each waveform causing interference to the other waveform. An appropriate amount of transmit power may be used for each waveform to achieve the desired coverage for that waveform. Alternatively or additionally, the coding and modulation for each waveform may be selected to achieve the desired coverage. For example, a lower code rate and/or a lower order modulation scheme may be used for the OFDM waveform if a W-CDMA waveform is superimposed.

The superposition of W-CDMA and OFDM may be used to conveniently send small amounts of data using W-CDMA without the need to allocate an entire time slot for W-CDMA. For example, indicator and control channels may be sent using W-CDMA and superposed on OFDM. With superposition, the indicator and control channels may be sent as background transmission whenever there is any data to send for these channels. OFDM may also be superimposed with other types of transmission.

Table 1 shows three frame designs of the 4-tier frame structure shown in FIG. 2. For these frame designs, the header field for the pilot and overhead information is 40 ms, each super-frame includes four outer-frames (K=4), the frames and time slots conform to W-CDMA, and two time slots in each frame are used for W-CDMA. Other designs for the 4-tier frame structure with different values for K, N, T, M, and V are also possible and are within the scope of the invention.

TABLE 1

| Parameters | Design 1 | Design 2 | Design 3 |
|---|---|---|---|
| Super-frame duration | 1320 ms | 1280 ms | 1000 ms |
| Pilot and overhead duration | 40 ms | 40 ms | 40 ms |
| Outer-frame duration | 320 ms | 310 ms | 240 ms |
| Frame duration | 10 ms | 10 ms | 10 ms |
| Number of frames/outer-frame | N = 32 | N = 31 | N = 24 |
| Number of time slots/frame | T = 15 | T = 15 | T = 15 |
| Number of time slots/outer-frame | M = 480 | M = 465 | M = 360 |
| Max number of E-MBMS slots/outer-frame | V = 416 | V = 403 | V = 312 |

The parameters (e.g., K, N, and T) for the frame structure may be fixed. Alternatively, the frame structure may be configurable, and the values for configurable parameters may be broadcast to the terminals.

The system may define physical channels to facilitate allocation and use of the available system resources. A physical channel is a means for sending data at a physical layer and may also be called a channel, a physical layer channel, a traffic channel, a transmission channel, a data channel, and so on. A physical channel that is transmitted on the downlink using OFDM is called an E-MBMS physical channel, a FLO physical channel, or some other terminology. E-MBMS physical channels may be used to send data from a higher layer (e.g., a link layer). For example, data for different services may be processed and mapped to transport channels (or logical channels) at the higher layer. The transport channels may be mapped to E-MBMS physical channels at the physical layer, e.g., each transport channel may be mapped to one physical channel. E-MBMS physical channels with configurable capacity for carrying streaming data may be obtained by properly allocating time slots to these E-MBMS physical channels.

An E-MBMS physical channel may be used to send a user-specific or unicast transmission to a specific terminal, a multicast transmission to a group of terminals, or a broadcast transmission to all terminals within a broadcast coverage area. E-MBMS physical channels may be used to send various types of data such as, e.g., traffic data, control data, multicast and broadcast data (e.g., for audio, video, tele-text, data, video/audio clips, and so on), and other data. E-MBMS physical channels may also be used for various services such as, e.g., E-MBMS in Universal Mobile Telecommunication System (UMTS). UMTS conventionally uses W-CDMA to support MBMS. MBMS and E-MBMS may be more efficiently supported with OFDM.

For the frame structure shown in FIG. 2, a total of $T_{KN}=K \cdot N \cdot T$ time slots are available in each super-frame. The available time slots may be allocated to E-MBMS physical channels in various manners. In an embodiment, each E-MBMS slot is allocated to one E-MBMS physical channel, and multiple E-MBMS physical channels do not share the same E-MBMS slot. This embodiment simplifies the allocation of E-MBMS slots to E-MBMS physical channels. In another embodiment, each OFDM symbol within an E-MBMS slot may be allocated to an E-MBMS physical channel, and up to L E-MBMS physical channels may share the same E-MBMS slot. This embodiment allows system resources to be allocated in smaller units, or finer granularity, to E-MBMS physical channels. In yet another embodiment, multiple E-MBMS physical channels may share each OFDM symbol in each E-MBMS slot using FDM. This embodiment provides the most flexibility in the allocation of system resources to E-MBMS physical channels but also uses more overhead to convey the resource allocation in each super-frame. For clarity, the following description is for the embodiment in which each E-MBMS slot is allocated to one E-MBMS physical channel. An E-MBMS physical channel may be allocated one or more time slots in one or more frames of a super-frame.

For frame design 2 shown in Table 1 with K=4, N=32, and T=15, each outer-frame includes 480 time slots, and each super-frame includes a total of 1920 time slots. If two time slots are reserved for W-CDMA in each frame, as shown in FIGS. 4A and 4B, then each outer-frame includes 416 time slots that may be used for OFDM or W-CDMA. If all 416 time slots are used for OFDM and if each E-MBMS physical channel is allocated at least one time slot in each outer-frame, then up to 416 E-MBMS physical channels may be sent in a super-frame. An E-MBMS physical channel may be allocated with up to 416 time slots in an outer-frame, or up to 1664 time slots in a super-frame.

In an embodiment, each E-MBMS physical channel that is transmitted in a given super-frame is allocated one or more time slots in one or more frames of each outer-frame in the super-frame. Each E-MBMS physical channel is thus characterized by allocated time slots and allocated frames in the outer-frames of a super-frame. Each E-MBMS physical channel has the same slot and frame allocation for all K outer-frames of the super-frame. For example, an E-MBMS physical channel may be allocated the i-th time slot in the n-th frame of each outer-frame in the super-frame. In this example, the E-MBMS physical channel is allocated a total of K time slots that are evenly spaced apart by N·T time slots. An E-MBMS physical channel may also be allocated multiple time slots in each outer-frame. These multiple time slots may be (1) adjacent to one another to minimize the amount of time needed to receive the E-MBMS physical channel or (2) distributed across the outer-frame to improve time diversity.

Figure 7:
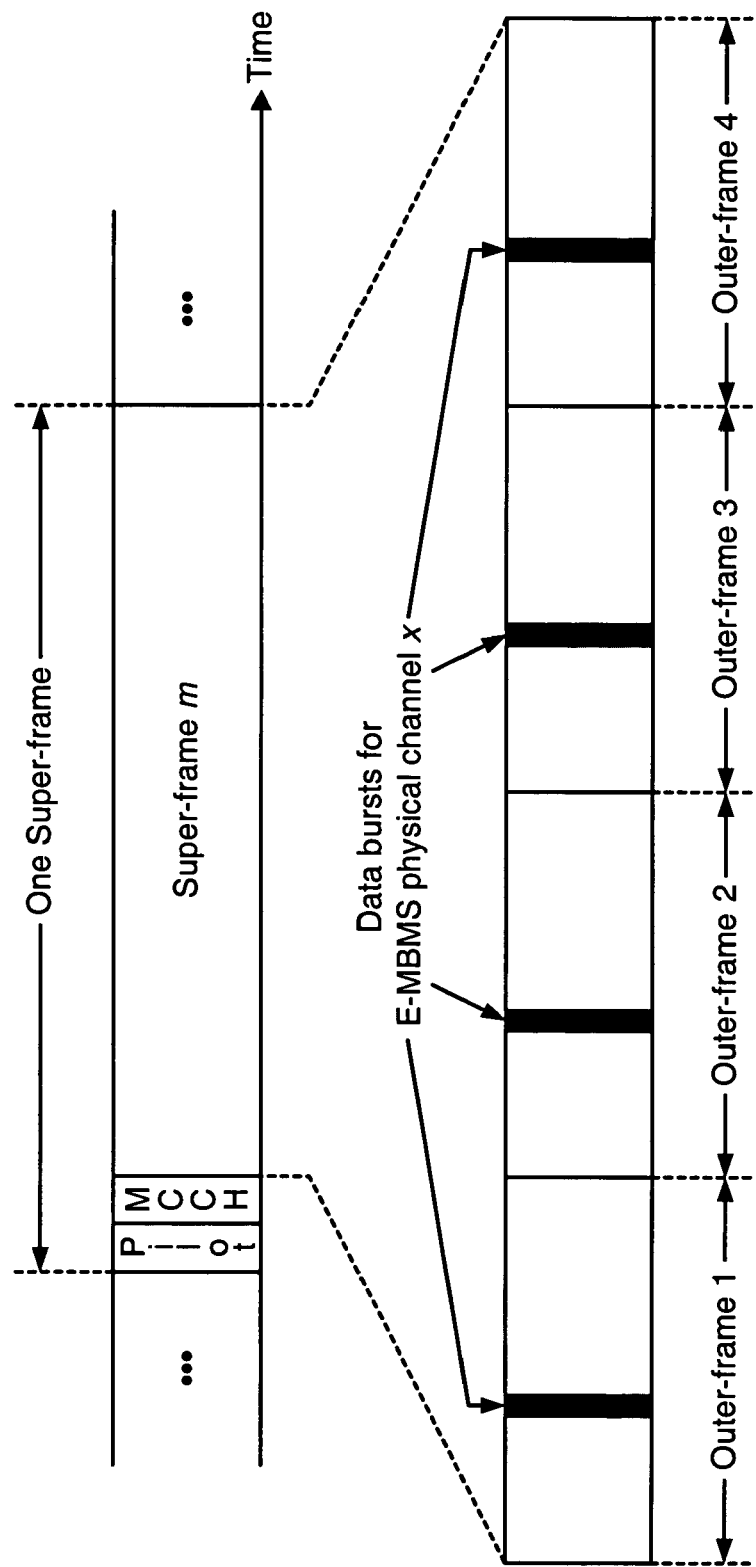
FIG. 7 shows transmission of a physical channel in the 4-tier frame structure.

FIG. 7 shows an exemplary transmission of an E-MBMS physical channel x for the 4-tier frame structure shown in FIG. 2 and the 3-tier frame structure shown in FIG. 3. In this example, E-MBMS physical channel x is transmitted in four bursts on the time slots allocated to E-MBMS physical channel x for super-frame m. These four bursts are transmitted at the same location in the four outer-frames of the super-frame, one burst per outer-frame. Each burst may span one or multiple time slots. Although not shown in FIG. 7, E-MBMS physical channel x may be allocated different time slots and frames in another super-frame.

FIG. 7 also shows transmission of the TDM pilot and overhead/control information in the header field at the start of each super-frame. The TDM pilot may be transmitted in a partial time slot, a full time slot, or multiple time slots and may be used for synchronization and possibly channel estimation. The overhead information may be sent in an MBMS control channel (MCCH), which may also be called an overhead information symbol (OIS) or some other terminology. The MCCH may also be sent in a partial, full, or multiple time slots and may carry pertinent overhead information for E-MBMS physical channels. The overhead information for each E-MBMS physical channel may convey, for example, the time slot(s) and frame(s) allocated to the E-MBMS physical channel, the coding and modulation schemes to use for the E-MBMS physical channel, the transport block (TB) size, the transport channel mapped to the E-MBMS physical channel, and so on. The TDM pilot and MCCH may also be sent in other manners different from the manner shown in FIG. 7.

The E-MBMS physical channels may carry wide-area data and local data. Wide-area data (or global data) is traffic data that may be broadcast by all or many base stations in the system. Local data is traffic data that may be broadcast by a subset of the base stations (e.g., each base station) for a given wide-area transmission. A set of base stations may broadcast a given wide-area transmission, and different subsets of these base stations may broadcast different local transmissions. Different sets of base stations may broadcast different wide-area transmissions. The wide-area and local transmissions may be viewed as different transmissions with different coverage areas.

A super-frame may be partitioned into (1) a wide-area segment used to send wide-area data and (2) a local segment used to send local data. A wide-area MCCH may convey overhead information for E-MBMS physical channels carrying wide-area data, and a local MCCH may convey overhead information for E-MBMS physical channels carrying local data. A wide-area TDM pilot and a local TDM pilot may also be transmitted to facilitate synchronization and channel estimation for wide-area and local E-MBMS physical channels, respectively.

As shown in FIG. 4A, L OFDM symbols may be transmitted in each E-MBMS slot. To generate an OFDM symbol, a modulation symbol or a zero symbol (which is a signal value of zero) is first mapped to each of the S total subbands. The S modulation and/or zero symbols are then transformed to the time-domain with an S-point inverse fast Fourier transform (IFFT) to generate a first sequence of S time-domain samples. A second sequence of S+C+2W samples is then formed by (1) copying the last C+W samples of the first sequence and appending these C+W samples as a prefix at the start of the first sequence and (2) copying the first W samples of the first sequence and appending these W samples as a suffix at the tail of the first sequence. The first W samples of the prefix are windowed (or filtered), and the subsequent C samples of the prefix form a flat guard interval. The guard interval is also called a cyclic prefix and is used to combat intersymbol interference (ISI) caused by frequency selective fading. The W samples of the suffix are also windowed. An OFDM symbol containing W+C+S+W samples is generated after windowing the prefix and suffix of the second sequence. The L OFDM symbols for each E-MBMS slot are transmitted such that the last W samples of one OFDM symbol overlaps with the first W samples of the next OFDM symbol. Each OFDM symbol thus has an effective length of S+C+W samples.

In an embodiment, the OFDM symbol duration is selected to be around 200 µs to 220 µs. If each time slot has a duration of 667 µs, then each E-MBMS slot includes three OFDM symbols, or L=3. Table 2 shows various parameters for an OFDM symbol in accordance with an exemplary embodiment. For this embodiment, there are 1024 total subbands, 68 subbands on each of the two band edges are not used, and the 888 center subbands may be used to send data and/or pilot. Other values may also be selected for these parameters based on system requirements and other considerations, and this is within the scope of the invention.

TABLE 2

| Parameter | Symbol | | Value |
|---|---|---|---|
| Sample rate | $f_s$ | | 5.4 MHz |
| Sample period | $T_s$ | $T_s = 1/f_s$ | 185.19 ns |
| Total number of subbands | S | | 1024 |
| Number of guard subbands | G | | 136 |
| Number of usable subbands | U | U = S − G | 888 |
| Number of samples for cyclic prefix | C | | 108 |
| Number of samples for window | W | | 22 |
| Useful duration of OFDM symbol | $T_u$ | $T_u = S \cdot T_s$ | 189.63 µs |
| Cyclic prefix duration | $T_{cp}$ | $T_{cp} = C \cdot T_s$ | 20 µs |
| Window duration | $T_w$ | $T_w = W \cdot T_s$ | 4.074 µ |
| Total OFDM symbol duration | $T_{ofdm}$ | $T_{ofdm} = T_u + T_{cp} + T_w$ | 213.71 µ |
| OFDM waveform duration | $T_{embms}$ | $T_{embms} = L \cdot T_{ofdm}$ | 641.11 µ |

An FDM pilot may be sent in each OFDM symbol and used for channel estimation. An FDM pilot is a pilot sent on P subbands that are (e.g., evenly) distributed across the S total subbands, where P>1. For the exemplary embodiment shown in Table 2, the FDM pilot may be sent on P=128 subbands that are spaced apart by eight subbands. The U=888 usable subbands would then include 111 subbands used for the FDM pilot (or pilot subbands) and 777 subbands used for traffic data (or data subbands). Pilot and data are not transmitted on the 136 guard subbands.

Figure 8:
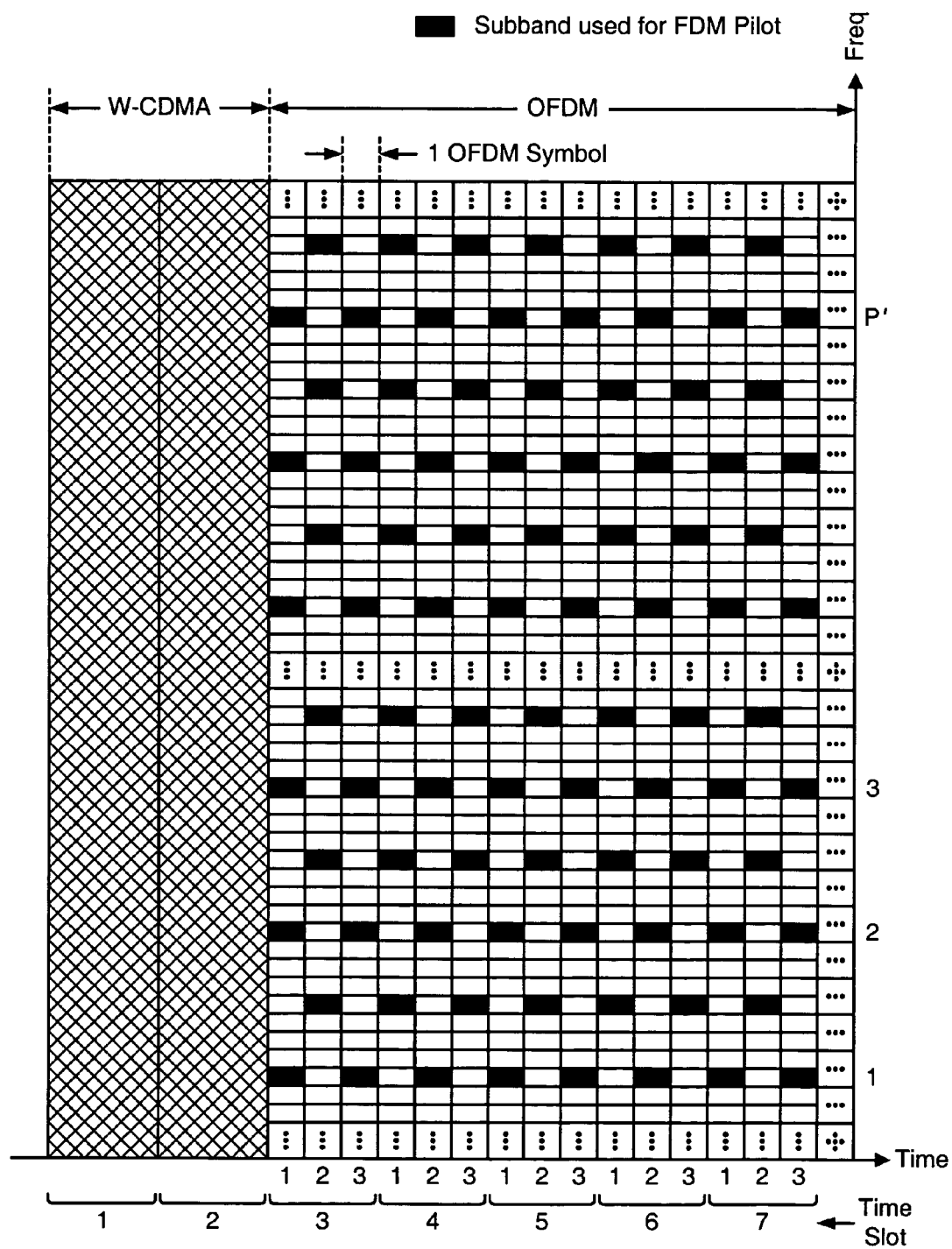
FIG. 8 shows an FDM pilot transmission scheme.

FIG. 8 shows an exemplary FDM pilot transmission scheme. For simplicity, FIG. 8 shows only the first seven time slots of the multiplexing example shown in FIG. 4A. The first two time slots are W-CDMA slots. Each subsequent time slot is an OFDM slot that includes three OFDM symbols. An FDM pilot is sent in each OFDM symbol on P'=111 pilot subbands.

To improve channel estimation performance, the FDM pilot may be staggered and transmitted on different subbands in different OFDM symbols. For the example shown in FIG. 8, the FDM pilot is transmitted with a staggering pattern composed of two subband sets, which is referred to as a staggering factor of two or 2× staggering. The FDM pilot is transmitted on a first set of subbands in one OFDM symbol, then on a second set of subbands in the next OFDM symbol, then on the first subband set in the next OFDM symbol, and so on. The subbands in the first set are offset by four from the subbands in the second set. The FDM pilot may also be transmitted with other staggering patterns composed of more than two subband sets, e.g., for 3× staggering, 4× staggering, and so on. The staggering allows the receiver to (1) evenly sample the entire system bandwidth in the frequency domain and (2) derive a longer channel impulse response estimate, which may be used to combat a delay spread that is longer than the cyclic prefix duration.

Figure 9:
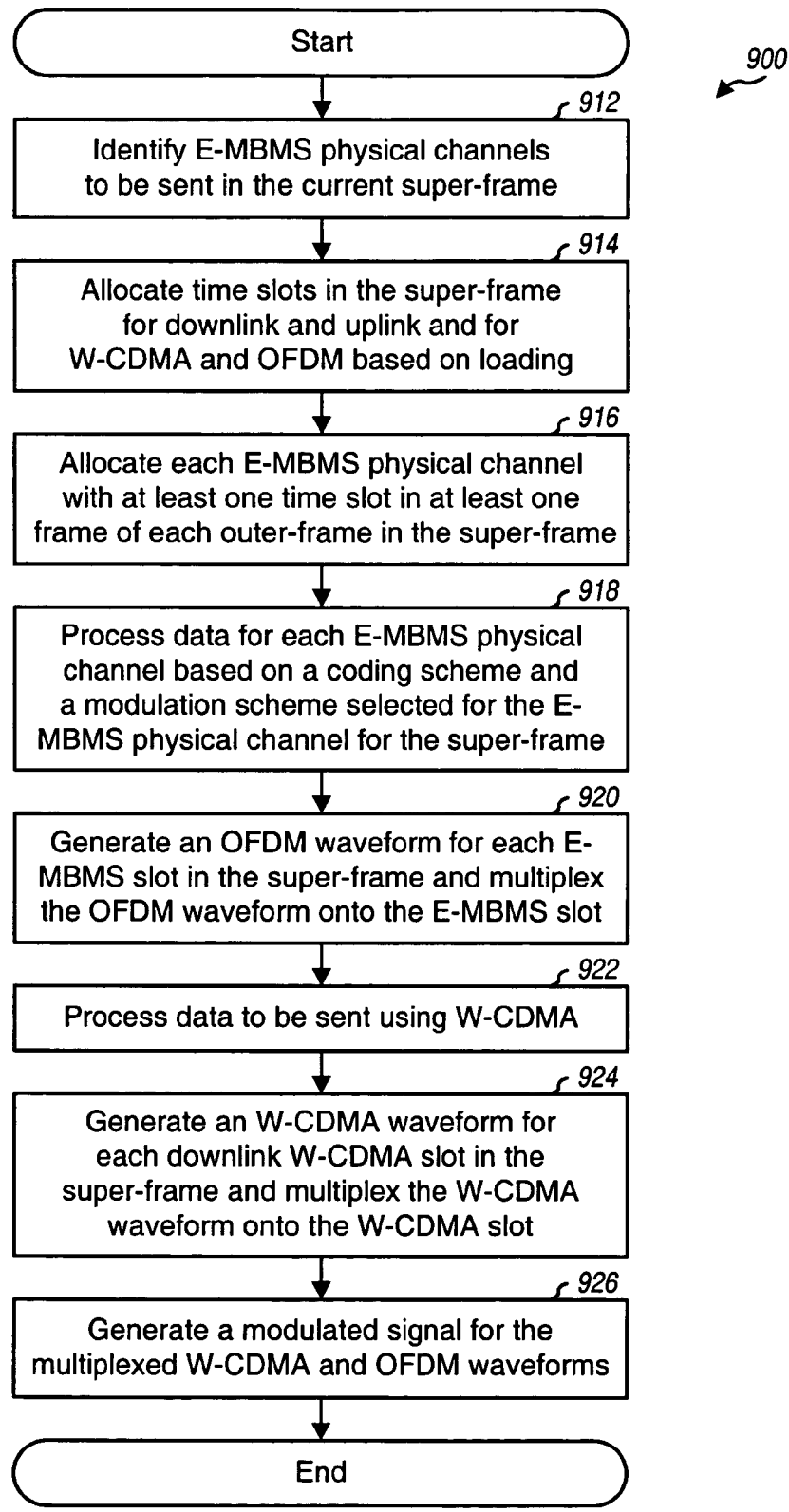
FIG. 9 shows a process for transmitting data with both W-CDMA and OFDM.

FIG. 9 shows a process 900 for transmitting data with both W-CDMA and OFDM. Process 900 may be performed by a base station for each super-frame. Initially, the E-MBMS physical channels to be sent in the current super-frame are identified (block 912). Time slots in the current super-frame are then allocated for downlink and uplink (for a TDD system) and for W-CDMA and OFDM (for both TDD and FDD systems) based on system loading (block 914). Each E-MBMS physical channel is allocated at least one time slot in at least one frame of each outer-frame in the current super-frame (block 916). The data for each E-MBMS physical channel is processed based on a coding scheme and a modulation scheme selected for that E-MBMS physical channel for the current super-frame (block 918). An OFDM waveform is generated for each E-MBMS slot in the current super-frame and multiplexed onto the E-MBMS slot (block 920). Data to be sent using W-CDMA is processed in accordance with W-CDMA (block 922). A W-CDMA waveform is generated for each downlink W-CDMA slot in the current super-frame and multiplexed onto the slot (block 924). A modulated signal is generated for the multiplexed W-CDMA and OFDM waveforms and transmitted on the downlink (block 926).

Figure 10:
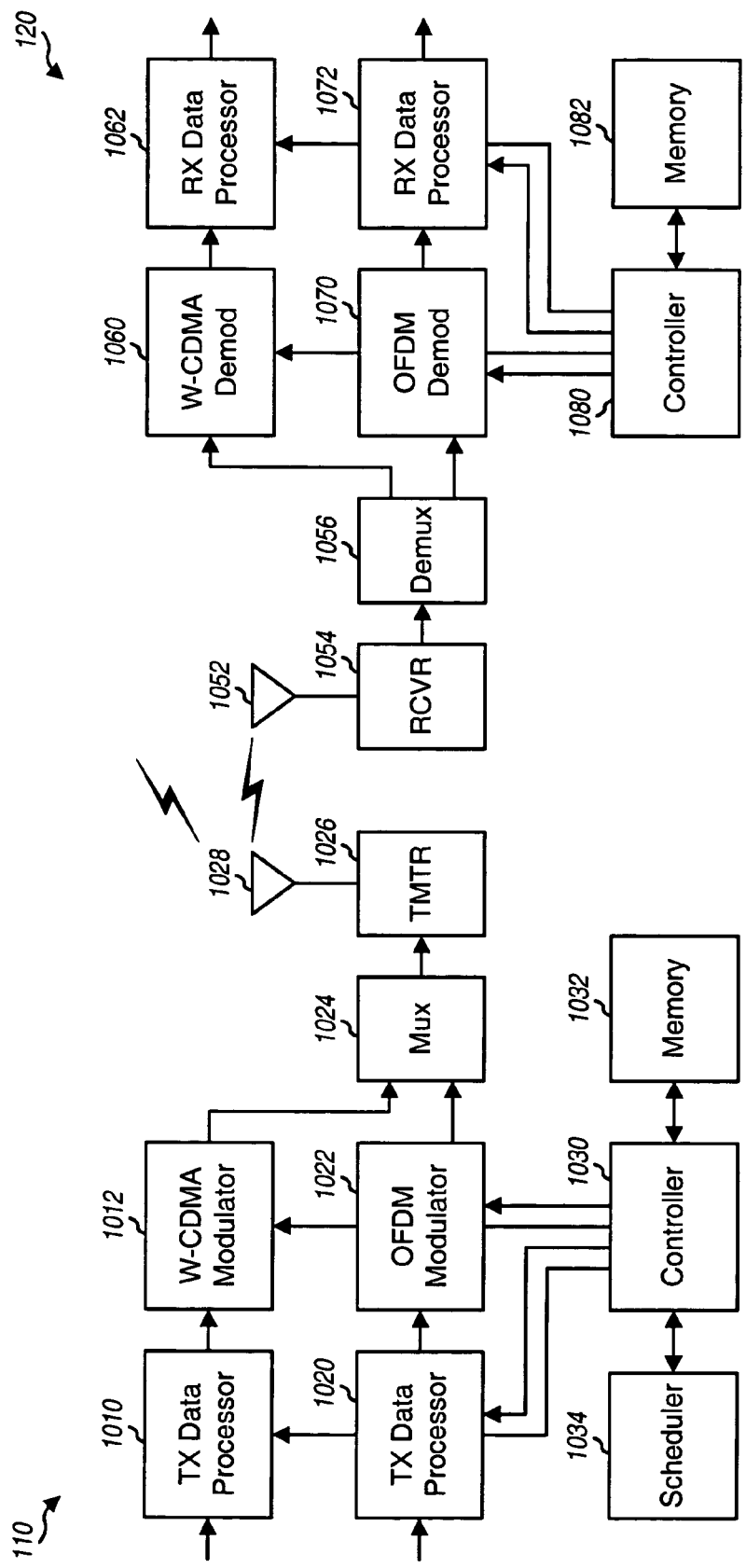
FIG. 10 shows a block diagram of a base station and a terminal.

FIG. 10 shows a block diagram of an embodiment of base station 110 and terminal 120. At base station 110, a W-CDMA TX data processor 1010 receives and processes data to be transmitted with W-CDMA and generates coded data for W-CDMA. A W-CDMA modulator 1012 processes the W-CDMA coded data and generates a W-CDMA waveform for each W-CDMA slot. The processing by W-CDMA modulator 1012 includes (1) mapping the coded data for each W-CDMA physical channel to modulation symbols, (2) channelizing the modulation symbols for each physical channel with an orthogonal sequence, (3) scrambling the channelized symbols for each physical channel with a scrambling code, and (4) scaling and summing the scrambled data for all physical channels. An OFDM TX data processor 1020 receives and processes data to be transmitted using OFDM and generates data and pilot symbols. An OFDM modulator 1022 performs OFDM modulation on the data and pilot symbols, generates OFDM symbols, and forms an OFDM waveform for each E-MBMS slot. A multiplexer (Mux) 1024 multiplexes W-CDMA waveforms onto W-CDMA slots, multiplexes OFDM waveforms onto E-MBMS slots, and provides an output signal. A transmitter unit (TMTR) 1026 conditions (e.g., converts to analog, filters, amplifies, and frequency upconverts) the output signal and generates a modulated signal that is transmitted from an antenna 1028.

At terminal 120, an antenna 1052 receives the modulated signal transmitted by base station 110 and provides a received signal to a receiver unit (RCVR) 1054. Receiver unit 1054 conditions, digitizes, and processes the received signal and provides a stream of samples to a demultiplexer (Demux) 1056. Demultiplexer 1056 provides samples in W-CDMA slots to a W-CDMA demodulator (Demod) 1060 and samples in E-MBMS slots to an OFDM demodulator 1070. W-CDMA demodulator 1060 processes the received samples in a manner complementary to the processing by W-CDMA modulator 1012 and provides symbol estimates. A W-CDMA receive (RX) data processor 1062 processes (e.g., demodulates, deinterleaves, and decodes) the symbol estimates and provides decoded data for W-CDMA. OFDM demodulator 1070 performs OFDM demodulation on the received samples and provides data symbol estimates. An OFDM RX data processor 1072 processes the data symbol estimates and provides decoded data for OFDM. In general, the processing at terminal 120 is complementary to the processing at base station 110.

Controllers 1030 and 1080 direct the operation at base station 110 and terminal 120, respectively. Memory units 1032 and 1082 store program codes and data used by controllers 1030 and 1080, respectively. Controller 1030 and/or a scheduler 1034 allocates time slots for the downlink and uplink, determines whether to use W-CDMA or OFDM for each time slot, and allocates time slots to E-MBMS physical channels.

Figure 11:
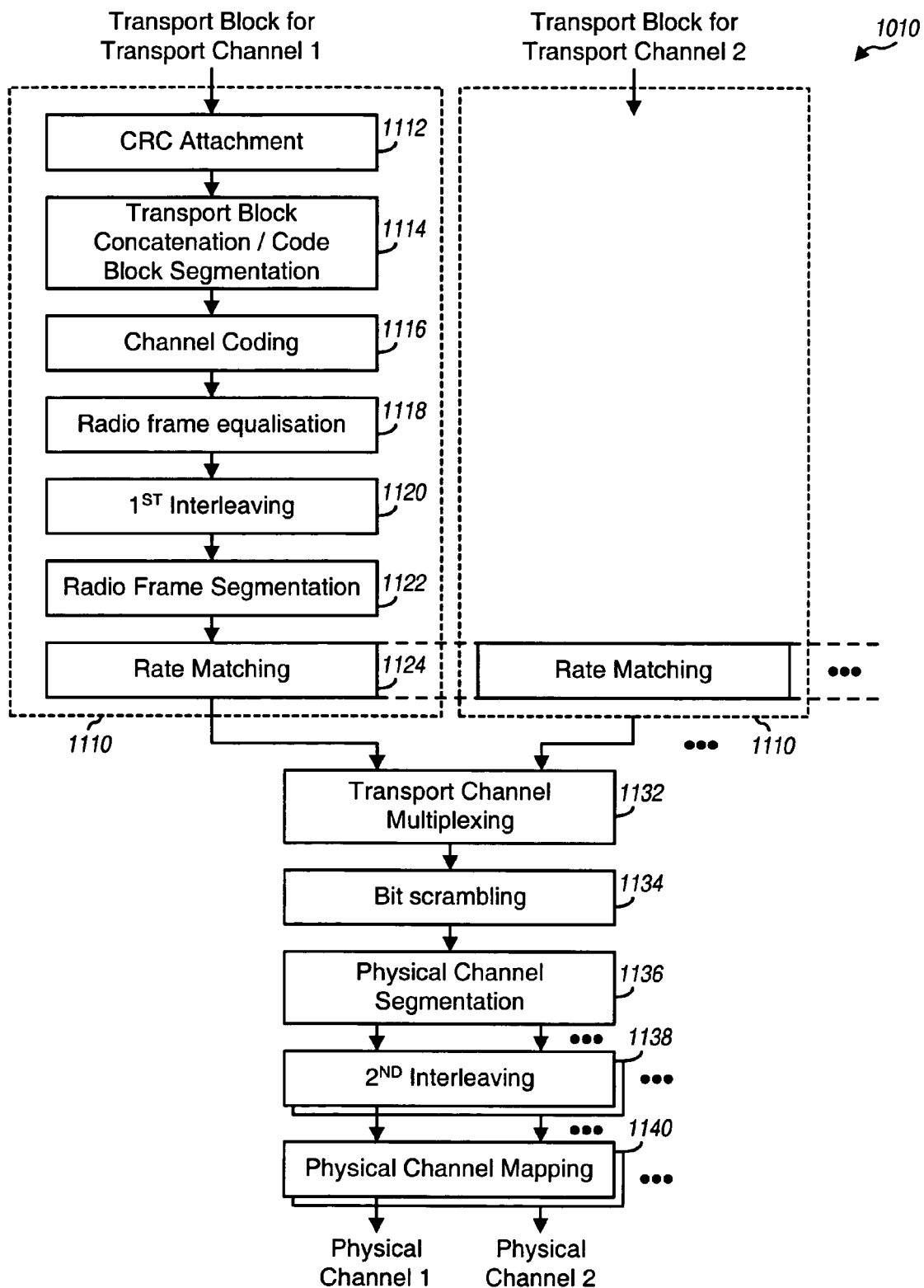
FIG. 11 shows a transmit (TX) data processor for W-CDMA.

FIG. 11 shows a block diagram of an embodiment of W-CDMA TX data processor 1010. Data for each transport channel (TrCH) is provided in transport blocks to a respective processing section 1110. Within section 1110, a cyclic redundancy check (CRC) value is generated for each transport block and attached to the transport block (block 1112). The CRC value may be used for error detection. CRC encoded blocks are serially concatenated and then partitioned into equal-sized code blocks (block 1114). Each code block is encoded with a coding scheme (e.g., a convolutional code or a Turbo code) or not encoded at all (block 1116). Radio frame equalisation may be performed to pad the input bit sequence so that the output can be segmented into an integer number of data segments of equal size (block 1118). The bits are then interleaved across 1, 2, 4 or 8 (10 ms) radio frames to provide time diversity (block 1120). The interleaved bits are segmented and mapped onto 10 ms TrCH radio frames (block 1122). Rate matching is then performed on the bits in accordance with rate matching parameters provided by higher layer (block 1124).

The TrCH radio frames from all processing sections 1110 are serially multiplexed into a coded composite transport channel (CCTrCH) (block 1132). Bit scrambling is then performed to randomize the bits (block 1134). If more than one physical channel is used, then the bits are segmented among the physical channels (block 1136). The bits in each radio frame for each physical channel are interleaved to provide additional time diversity (block 1138). The interleaved physical channel radio frames are then mapped to the proper physical channels (block 1140).

The processing by TX data processor 1010 for W-CDMA is described in detail in 3GPP TS 25.212. The processing by W-CDMA modulator 1012 is described in detail in 3GPP TS 25.213. These documents are publicly available.

Figure 12:
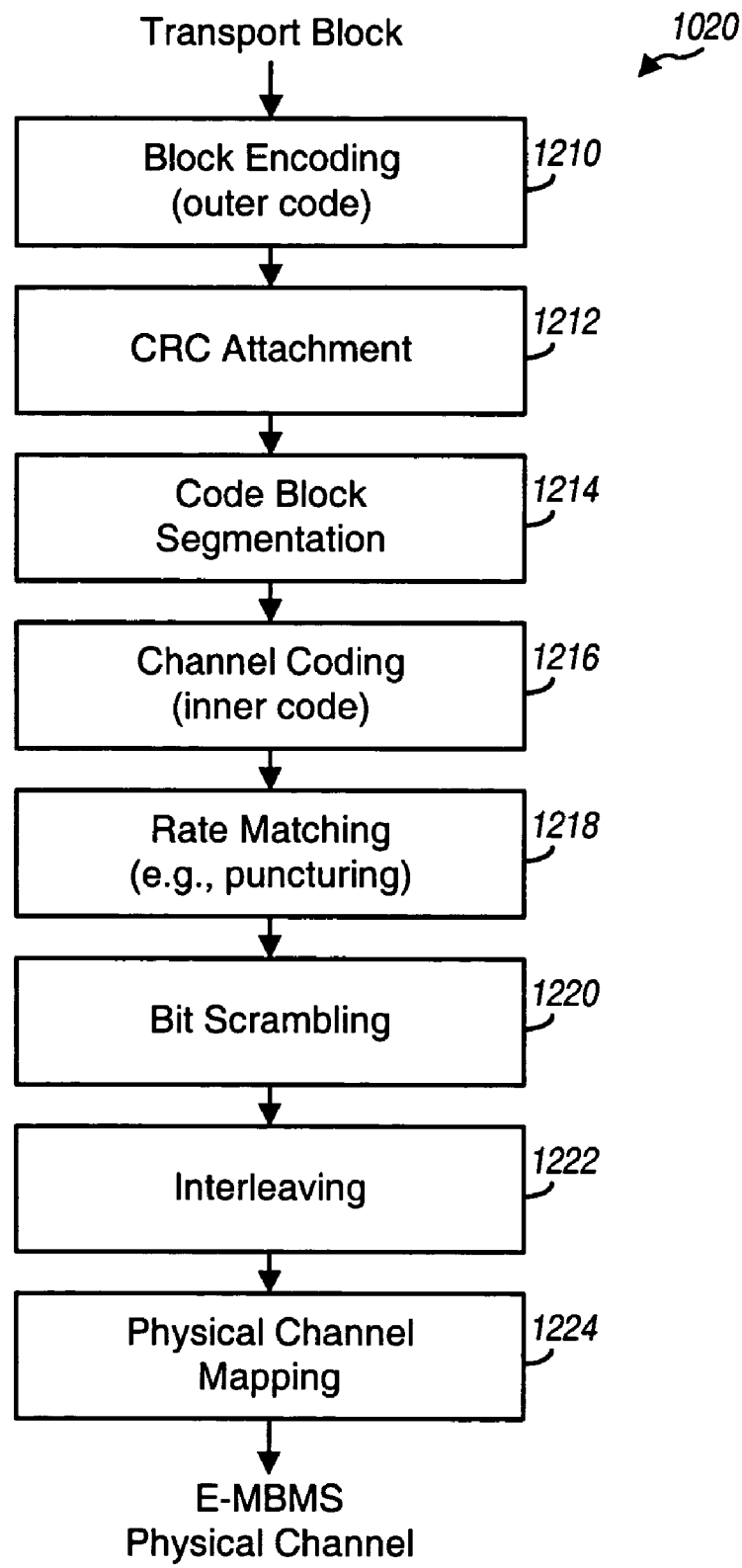
FIG. 12 shows a TX data processor for OFDM.

FIG. 12 shows a block diagram of an embodiment of OFDM TX data processor 1020. For clarity, FIG. 12 shows the processing for one E-MBMS physical channel. Within processor 1020, each transport block for the E-MBMS physical channel may be block encoded (e.g., with a Reed-Solomon code) or not block encoded to generate a block-encoded block (block 1210). A CRC value is generated and attached to the block-encoded block (block 1212). The CRC encoded block is partitioned into one or multiple equal-sized code blocks (block 1214). Each code block is encoded with a coding scheme (e.g., a convolutional code or a Turbo code) or not encoded at all (block 1216). Rate matching is then performed on the code bits in accordance with rate matching parameters provided by higher layer (block 1218). The rate-matched bits are randomized with a PN sequence (block 1220) and then interleaved to provide time diversity (block 1222). The interleaved bits are mapped to the E-MBMS physical channel (block 1224).

FIG. 12 shows a specific embodiment of the data processing for OFDM. The data processing may also be performed in other manners, and this is within the scope of the invention. For OFDM, each transport channel may be mapped to one physical channel, and the transport channel multiplexing in block 1132 of FIG. 11 may be omitted. The mapping of data streams to transport channels is performed at higher layer.

For each E-MBMS physical channel, a Turbo code and an (n, k) Reed Solomon code may both be employed to capture time diversity and improve performance. The Reed Solomon code may be used as an outer code, and the Turbo code may be used as an inner code. The Reed Solomon code rate (n, k) may be limited to (16, 12), (16, 14), and/or some other code rates to simplify block coding. In theory, it is preferable to perform Turbo coding over an entire transmission time interval (TTI), which is one super-frame for an E-MBMS physical channel. The Turbo code may be used alone without the outer code and, with sufficient interleaving, is capable of exploiting the time diversity in the system. However, from a practical point of view, there are restrictions imposed by the decoder buffer size. In these cases, the length of Turbo coded packets may be limited, and time diversity may be collected with the outer code. The outer code may or may not be used for each OFDM transmission. A primary role of the outer code is to assist in collecting time diversity.

Collecting time diversity is further facilitated by the frame structures described herein. A frame structure can provide a TTI of approximately one second (e.g., 1.28 seconds). Compared to a TTI of 80 ms for W-CDMA, a TTI of approximately one second for OFDM may improve performance because data is spread over multiple coherence time intervals, where each coherence time interval may be a few milliseconds. Transmission of traffic data in bursts over the TTI of approximately one second may also reduce battery power consumption. For an E-MBMS transmission, a terminal may wake up periodically to receive a burst sent in each outer-frame and may sleep between bursts to conserve battery power. Each burst may be as short as one time slot or 0.667 ms. In contrast, the terminal may need to be awake for an entire 80 ms TTI in order to receive a W-CDMA transmission.

The frame structure and transmission techniques described herein may be implemented by various means. For example, these techniques may be implemented in hardware, software, or a combination thereof. For a hardware implementation, the processing units used to allocate time slots and process data for different radio technologies at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to receive data at a terminal may also be implemented within one or more ASICs, DSPs, processors, and so on.

For a software implementation, the techniques may be implemented with modules (e.g., procedures, functions, and so on) that perform the functions described herein. The software codes may be stored in a memory unit (e.g., memory unit 1032 or 1082 in FIG. 10) and executed by a processor (e.g., controller 1030 or 1080). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a first modulator to generate a first waveform in accordance with a first radio technology;
   a second modulator to generate a second waveform in accordance with a second radio technology, wherein the duration of each symbol in the second waveform is selected based on expected delay spread and coherence time of a communication link; and
   a multiplexer to multiplex the first waveform onto a first time slot and to multiplex the second waveform onto a second time slot.

2. The apparatus of claim 1, wherein the first radio technology is a spread spectrum radio technology, and wherein the second radio technology is a multi-carrier radio technology.

3. The apparatus of claim 2, wherein the second radio technology is Orthogonal Frequency Division Multiplexing (OFDM), Interleaved Frequency Division Multiple Access (IFDMA), or Localized FDMA (LFDMA).

4. The apparatus of claim 1, wherein the first radio technology is Orthogonal Frequency Division Multiplexing (OFDM) for a unicast transmission, and wherein the second radio technology is OFDM for a multicast transmission or a broadcast transmission.

5. The apparatus of claim 1, wherein the first waveform is for at least one unicast transmission, and wherein the second waveform is for a multicast transmission or a broadcast transmission.

6. An apparatus comprising:
   a first modulator to generate a Wideband Code Division Multiple Access (w-CDMA) waveform;
   a second modulator to generate an Orthogonal Frequency Division Multiplexing (OFDM) waveform, wherein the second modulator generates at least one OFDM symbol and forms the OFDM waveform with the at least one OFDM symbol, and wherein the duration of each OFDM symbol is selected based on expected delay spread and coherence time of a communication link; and
   a multiplexer to multiplex the W-CDMA waveform onto a first time slot and to multiplex the OFDM waveform onto a second time slot.

7. The apparatus of claim 6, further comprising:
   a transmitter to generate a modulated signal for the multiplexed W-CDMA and OFDM waveforms and to transmit the modulated signal on a downlink.

8. The apparatus of claim 6, wherein the second modulator generates three OFDM symbols and forms the OFDM waveform with the three OFDM symbols.

9. A method comprising:
   generating a Wideband Code Division Multiple Access (W-CDMA) waveform;
   generating an Orthogonal Frequency Division Multiplexing (OFDM) waveform that comprises at least one OFDM symbol, wherein the duration of each OFDM symbol is selected based on expected delay spread and coherence time of a communication link;
   multiplexing the W-CDMA waveform onto a first time slot; and
   multiplexing the OFDM waveform onto a second time slot.

10. The method of claim 9, further comprising:
    generating a modulated signal for the multiplexed W-CDMA and OFDM waveforms; and
    transmitting the modulated signal on a downlink.

11. An apparatus comprising:
    means for generating a Wideband Code Division Multiple Access (W-CDMA) waveform;
    means for generating an Orthogonal Frequency Division Multiplexing (OFDM) waveform that comprises at least one OFDM symbol, wherein the duration of each OFDM symbol is selected based on expected delay spread and coherence time of a communication link;
    means for multiplexing the W-CDMA waveform onto a first time slot; and
    means for multiplexing the OFDM waveform onto a second time slot.

12. The apparatus of claim 11, further comprising:
    means for generating a modulated signal for the multiplexed W-CDMA and OFDM waveforms; and
    means for transmitting the modulated signal on a downlink.

13. An apparatus comprising:
    a controller to select at least one radio technology among a plurality of radio technologies for each time slot in each outer-frame of a super-frame, wherein the super-frame comprises a plurality of outer-frames and each outer-frame comprises a plurality of time slots; and
    a processor to process data for each time slot in accordance with the at least one radio technology selected for the time slot;
    wherein the controller selects at least one radio technology among the plurality of radio technologies for each time slot of each frame in each outer-frame of the super-frame, wherein each outer-frame comprises a plurality of frames and each frame comprises at least two time slots, wherein the controller selects Wideband Code Division Multiple Access (W-CDMA) for at least one time slot in each frame and selects W-CDMA or Orthogonal Frequency Division Multiplexing (OFDM) for each remaining time slot in the frame.

14. The apparatus of claim 13, wherein the plurality of radio technologies comprise Wideband Code Division Multiple Access (W-CDMA) and Orthogonal Frequency Division Multiplexing (OFDM).

15. The apparatus of claim 13, wherein the plurality of time slots in each outer-frame are used for downlink transmission.

16. The apparatus of claim 13, wherein each of the plurality of time slots in each outer-frame is usable for downlink or uplink transmission.

17. The apparatus of claim 13, wherein, for each frame, at least one time slot is used for downlink transmission, at least one time slot is used for uplink transmission, and each remaining time slot is usable for downlink or uplink transmission.

18. The apparatus of claim 13, wherein, for each frame, at least one time slot is used for uplink transmission and each remaining time slot is usable for downlink or uplink transmission.

19. The apparatus of claim 13, wherein each frame has a duration of 10 milliseconds and comprises 15 time slots.

20. The apparatus of claim 13, wherein the super-frame has a duration of approximately one second.

21. A method comprising:
selecting at least one radio technology among a plurality of radio technologies for each time slot in each outer-frame of a super-frame, wherein the super-frame comprises a plurality of outer-frames and each outer-frame comprises a plurality of time slots; and
processing data for each time slot in accordance with the at least one radio technology selected for the time slot;
wherein the at least one radio technology among the plurality of radio technologies is selected for each time slot of each frame in each outer-frame of the super-frame, wherein each outer-frame comprises a plurality of frames and each frame comprises at least two time slots, wherein Wideband Code Division Multiple Access (W-CDMA) is selected for at least one time slot in each frame and W-CDMA or Orthogonal Frequency Division Multiplexing (QFDM) is selected for each remaining time slot in the frame.

22. An apparatus comprising:
means for selecting at least one radio technology among a plurality of radio technologies for each time slot in each outer-frame of a super-frame, wherein the super-frame comprises a plurality of outer-frames and each outer-frame comprises a plurality of time slots; and
means for processing data for each time slot in accordance with the at least one radio technology selected for the time slot;
wherein the at least one radio technology among the plurality of radio technologies is selected for each time slot of each frame in each outer-frame of the super-frame, wherein each outer-frame comprises a plurality of frames and each frame comprises at least two time slots, wherein Wideband Code Division Multiple Access (W-CDMA) is selected for at least one time slot in each frame and W-CDMA or Orthogonal Frequency Division Multiplexing (OFDM) is selected for each remaining time slot in the frame.

23. A computer-program product comprising a computer-readable medium having instructions thereon, the instructions comprising:
code for generating a Wideband Code Division Multiple Access (W-CDMA) waveform;
code for generating an Orthogonal Frequency Division Multiplexing (OFDM) waveform that comprises at least one OFDM symbol, wherein the duration of each OFDM symbol is selected based on expected delay spread and coherence time of a communication link;
code for multiplexing the first waveform onto a first time slot; and
code for multiplexing the second waveform onto a second time slot.

\* \* \* \* \*